3,063,889
METHOD OF JOINING THE EDGES OF WEBS TO FORM A LARGE AREA FILM FABRICATION
Charles E. Staff, Upper Montclair, N.J., assignor to Union Carbide Corporation, a corporation of New York
Filed Apr. 3, 1957, Ser. No. 650,380
5 Claims. (Cl. 156—201)

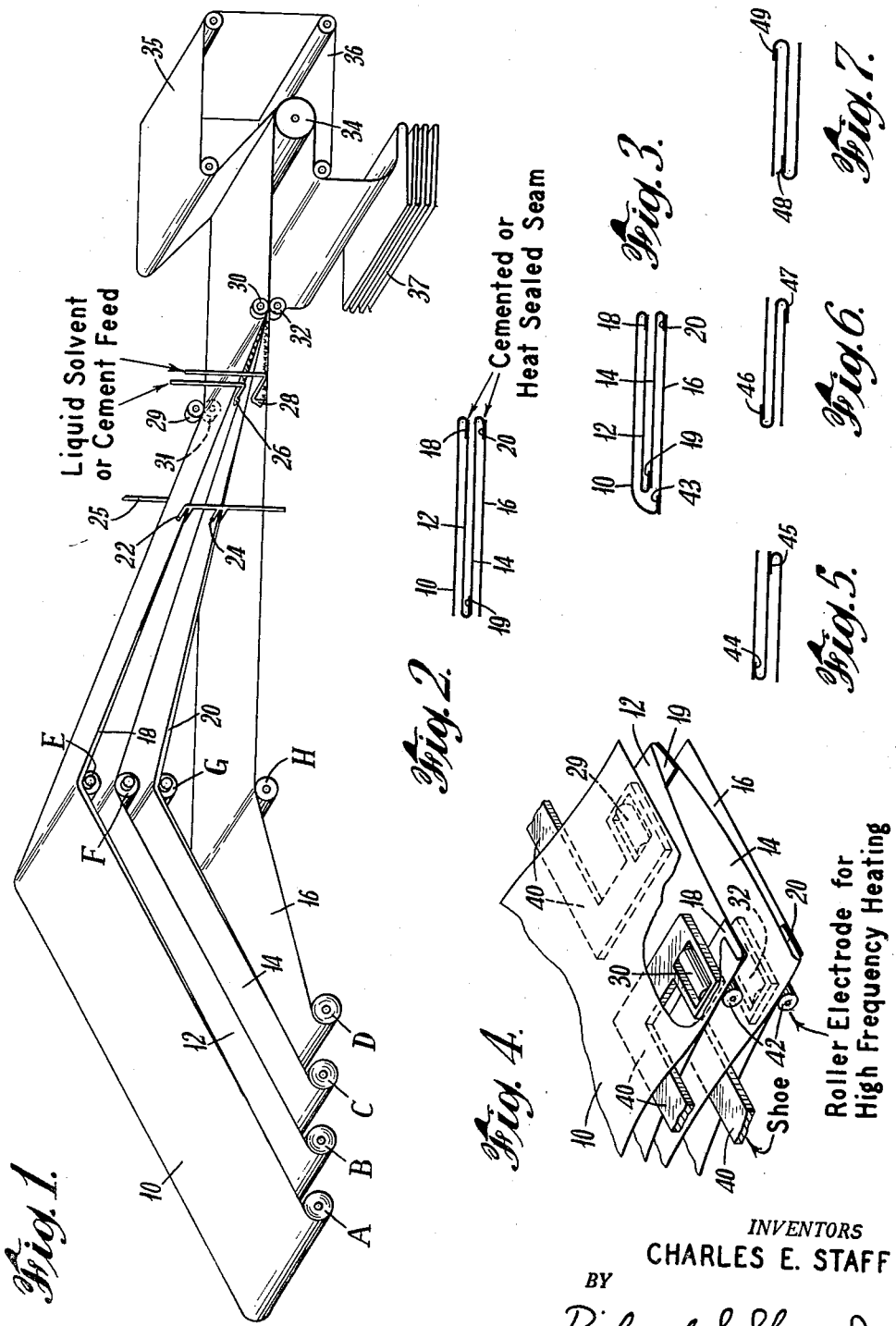
Nov. 13, 1962 — C. E. STAFF — 3,063,889
METHOD OF JOINING THE EDGES OF WEBS TO FORM A LARGE AREA FILM FABRICATION
Filed April 3, 1957
INVENTORS
CHARLES E. STAFF
BY
Richard S. Shreve, Jr.
ATTORNEY United States Patent Office 3,063,889
Patented Nov. 13, 1962

This invention relates to large area film fabrication and more particularly to a method of sealing of a series of sheets such that a wide unitary film can be produced.

The need for wide widths of films for example 40 and 60 feet wide for agricultural uses such as pond linings, haystack covers, trench silo covers, silage bags, and also other potential uses indicates a need for a cheaper means of fabrication than is obtained by existing sealing processes. As it is not now possible to produce sheets of this width directly, a number of sheet of lesser width must be joined together to give the desired large area. Most of the existing processes use solvent or high frequency sealing for vinyl and heat sealing of polyethylene. In these processes seams are generally made one at a time. In some cases the work is moved under the sealer; whereas, in other cases, the sealer is moved over the work. The great amount of handling results in the labor costs for this operation being frequently as high or higher than the material value.

The main object of the present invention is to provide simultaneous seam bonding of side margins of the sheets in juxtaposed relation to produce the wide film in a single pass.

According to the present invention, individual lengths of sheeting are seam-bonded together by continuously feeding at least three individual lengths longitudinally at the same rate of speed into juxtaposed relation of respective pairs thereof with their side margins in contacts, one hand side margin of one planar surface of each sheet contacting the facing same hand side margin of the next contiguous sheets of its pair, and then continuously bonding said contacting facing pairs of side margins together to form a stack of bonded sheets. Preferably the other hand side margins of the planar surfaces of alternate intermediate lengths contact the other hand side margins of the next contiguous intermediate sheet to form other hand pairs. Preferably, continuous individual lengths of sheets or thermoplastic film from a series of rolls are passed through guides which fold over the side margins of each sheet alternately at the right and left hand edge thereof back upon itself, then through solvent or adhesive spreaders, so situated as to apply solvent or adhesive to the surface of the unfolded side margin of one sheet contiguous to the folded side margin of another sheet, and then through pressure rollers to bond the folded side margin of each sheet to the planar surface of a contiguous sheet. This permits continuous rates of sealing of upwards of 100 ft. a minute to the maximum rate of the sealing device and by using a series of sealers and rolls of film practically any width of film can be produced in a single operation.

In the drawings:

FIG. 1 is a diagram of apparatus for large area film fabrication according the preferred embodiment of the present invention;

FIG. 2 is a cross section through the superimposed sheets in FIG. 1;

FIG. 3 is a cross section through a modified arrangement;

FIG. 4 is a detailed perspective view of the heating rollers; and

FIGS. 5, 6 and 7 are further modifications of FIG. 2.

As shown in FIG. 1, continuous individual lengths of sheet or film are unwound longitudinally and at the same rate of speed from a series of supply rolls A, B, C and D to supply the individual length 10, 12, 14 and 16, which are brought toward each other into juxtaposed relation in passing between nip rollers 29, 31 and 30, 32. Solvent or adhesive spreaders are mounted ahead of the nip rollers, the spreader 26 being located between the sheets 10 and 12, and the spreader 28 between the sheets 14 and 16. Thus the spreader 26 applies sealing liquid between the right hand side margins of alternate pairs of sheets, and similar spreaders on the left hand side of the machine apply sealing liquid between the pair of left hand side margins of intermediate sheets 12 and 14.

Preferably the right hand side margins of alternate sheets 10 and 14 pass through guides or edge turners 22 and 24 which fold the side margin of the sheet back upon itself along its length. A similar guide 25 on the other side of the machine folds the side margin of sheet 12 back upon itself. Thus when the sheets are juxtaposed, each folded side margin contacts the planar surface of a juxtaposed sheet. To permit the folded edges to register with the planar edges, the alternate rolls A and C should be offset to the right hand side.

The entire folding may be done by the guides, or as shown in FIG. 1 the sheets 10, 12, 14 and 16 may pass over a second series of rolls E, F, G, H, to curve one edge of each sheet alternately at the right and left edges through an angle of 90°. In the form shown the alternate rolls E and G are offset or let back from the edge of the sheet, so that the overhanging parts 18 and 20 of the sheets 10 and 14 hang down vertically. The same condition applies to the far end of the roll F which forms the overhanging part 19 of sheet 12.

From the rollers E, F, G, H, the sheets pass through the guides 22 and 24, which fold back each of the curved edges 18 and 20 upon itself through a second 90° to a total of 180°. The similar guide 25 on the opposite side of the sheets perform similar folding of the curved edge of the sheet 12.

From the guides the sheets pass to solvent or adhesive spreaders 26 and 28, which apply solvent or adhesive to the surface of the unfolded edges of sheets 12 and 16, contiguous to the folded edges 18 and 20 of the other sheets. A similar spreader on the opposite side applies solvent or adhesive to the unfolded edge of sheet 14 contiguous to the folded edge 19.

From the spreaders 26 and 28 the sheets pass between pressure rollers 30 and 32 to bond the folded edge of each sheet to the planar surface of a contiguous sheet. The bonded sheets then pass to a delivery roller 34 and a belt 35 having a folding flight 36 to form the product into a folded stack 37.

As shown in FIG. 4, the pressure rollers 30 and 32 may be carried by shoes 40 and spaced apart to cooperate with roller electrodes 42 for high frequency heating. Thus the pairs of side margins pass through respective separate spaced nips, as distinguished from all going through the same nip, as shown in FIG. 1.

As shown in FIG. 3, the free edge of sheet 10 may be curved downwardly and folded as at 43 and bonded to the free edge of sheet 16 to form a large area tubular sheet.

As shown in FIG. 5, the sheet edges may be curved upwardly to form folds 44 and 45 on top of their respective sheets. As shown in FIG. 6, the center sheet may have one edge folded upwardly as at 46, the other edge 46 folded downwardly as at 47, the free sheet edges being inside the folds. As shown in FIG. 7, the top sheet may be not folded, but the second and third sheets having alternate edges folded upwardly as at 48 and 49 with the free sheet edges inside the folds.

What is claimed is:
1. The method of bonding together the edge portions of a plurality of at least three substantially continuous sheets of material to form a single wide sheet element comprising the steps of continuously feeding such sheets to be joined into substantially superposed position, overfolding to a position between each adjacent pair of said sheets a marginal edge portion of one of the sheets of each such pair of sheets, and effecting a union of the surface of each such folded edge portions facing the next adjacent sheet to the contacting surface portion of such next adjacent sheet.

2. Method for flat seam bonding together individual lengths of thermoplastic sheeting to form therefrom a bonded large area sheet, which comprises separably passing coextensive individual lengths of sheeting of substantially the same width and each having side margins and forming two coextensive outside lengths with inside lengths therebetween respectively from a series of supply rolls over a set of supporting rolls, curving alternate side margins of said outside lengths and said inside lengths of said supporting rolls through an angle to form curved margins, advancing said outside lengths and said inside lengths from said supporting rolls to pass said curved margins through guides to fold the curved margins of the outside lengths and said inside lengths back on themselves, each of said outside lengths having one of its side margins free and its opposite side margin folded into overlapping relation with the facing side margin of its next contiguous length, continuously applying adhesive to at least one of the side margins of each overlapping relation, and passing said adhesive applied overlapping side margins through pressure rollers to bond said overlapping side margins together.

3. Method for bonding individual lengths of substantially continuous plastic sheet to form a single wide sheet element comprising continuously feeding two outside lengths and at least two inside lengths into substantially superposed positions each of said outside lengths having a free side margin and before such lengths are brought into contacting relation continuously folding back on itself the side margins of each of the outside lengths opposite their free side margins to a position adjacent an inside length and the alternate side margins of each of said inside lengths to a position adjacent another inside length, and effecting a union by a pressure bonding operation of the surface of each such folded back edge facing the next adjacent length to a surface portion of said next adjacent length in contact therewith.

4. Method as claimed in claim 3 wherein an adhesion promoting liquid is applied to at least one of the superposed adjacent surfaces of said lengths while the lengths are being fed to said pressure bonding operation.

5. Method as claimed in claim 3 wherein each pair of contacting surfaces is passed between a pair of electrically heated rollers to effect fusion bonding.

References Cited in the file of this patent

UNITED STATES PATENTS

| | | |
|---|---|---|
| 2,277,924 | Morrison | Mar. 31, 1942 |
| 2,445,703 | Williams | July 20, 1948 |
| 2,474,770 | Yount et al. | June 28, 1949 |
| 2,482,613 | Erickson | Sept. 20, 1949 |
| 2,511,031 | Yount | June 13, 1950 |
| 2,557,723 | Brenn | June 19, 1951 |
| 2,583,308 | Sloan | Jan. 22, 1952 |
| 2,610,934 | Steele | Sept. 16, 1952 |
| 2,633,286 | Claridge et al. | Mar. 31, 1953 |
| 2,651,588 | Bruce et al. | Sept. 8, 1953 |
| 2,656,293 | Huch | Oct. 20, 1953 |
| 2,712,342 | Claff et al. | July 5, 1955 |
| 2,803,578 | Holland | Aug. 20, 1957 |

FOREIGN PATENTS

| | | |
|---|---|---|
| 22,540 | Finland | May 21, 1948 |
| 490,338 | Italy | Feb. 8, 1954 |
| 200,241 | Australia | Nov. 23, 1955 |